United States Patent
Steven

(10) Patent No.: US 8,056,409 B2
(45) Date of Patent: Nov. 15, 2011

(54) HYBRID FLOWMETER THAT INCLUDES AN INTEGRAL VORTEX FLOWMETER AND A DIFFERENTIAL FLOW METER

(76) Inventor: Richard Steven, Fort Collins, CO (US)

( * ) Notice: Subject to any disclaimer, the term of this patent is extended or adjusted under 35 U.S.C. 154(b) by 18 days.

(21) Appl. No.: 12/310,591

(22) PCT Filed: Aug. 29, 2006

(86) PCT No.: PCT/GB2006/050261
§ 371 (c)(1),
(2), (4) Date: Feb. 27, 2009

(87) PCT Pub. No.: WO2008/025934
PCT Pub. Date: Mar. 6, 2008

(65) Prior Publication Data
US 2010/0224009 A1    Sep. 9, 2010

(51) Int. Cl.
G01F 7/00 (2006.01)
G01F 1/32 (2006.01)
G01F 1/37 (2006.01)
G01F 1/44 (2006.01)

(52) U.S. Cl. .................. 73/197; 73/861.22; 73/861.52; 73/861.63

(58) Field of Classification Search .......... None
See application file for complete search history.

(56) References Cited

U.S. PATENT DOCUMENTS

| 3,785,204 | A | | 1/1974 | Lisi | |
|---|---|---|---|---|---|
| 4,523,477 | A | * | 6/1985 | Miller | 73/861.02 |
| 5,060,522 | A | * | 10/1991 | Lew | 73/861.02 |
| 5,152,181 | A | | 10/1992 | Lew | |
| 5,456,107 | A | * | 10/1995 | Padden et al. | 73/239 |
| 5,501,099 | A | * | 3/1996 | Whorff | 73/29.01 |
| 5,723,783 | A | * | 3/1998 | Woodward | 73/203 |
| 5,808,209 | A | * | 9/1998 | Zielinska et al. | 73/861.22 |
| 6,648,820 | B1 | * | 11/2003 | Sarel | 600/300 |
| 6,957,586 | B2 | * | 10/2005 | Sprague | 73/861.22 |
| 7,028,528 | B2 | * | 4/2006 | Antonijevic | 73/1.16 |
| 7,258,024 | B2 | * | 8/2007 | Dimarco et al. | 73/861.22 |
| 7,308,832 | B1 | * | 12/2007 | Ifft et al. | 73/861.24 |
| 7,366,621 | B2 | * | 4/2008 | Sprague | 702/45 |
| 7,478,565 | B2 | * | 1/2009 | Young | 73/861.65 |
| 7,578,203 | B2 | * | 8/2009 | Andersen et al. | 73/861.21 |
| 2005/0241413 | A1 | | 11/2005 | Brandt, Jr. | |
| 2009/0326839 | A1 | * | 12/2009 | Rogers et al. | 702/47 |
| 2010/0191481 | A1 | * | 7/2010 | Steven | 702/47 |

FOREIGN PATENT DOCUMENTS

GB    2 161 941    1/1986

* cited by examiner

Primary Examiner — Harshad Patel
(74) Attorney, Agent, or Firm — Drinker Biddle & Reath LLP

(57) ABSTRACT

A new flowmeter which comprises a DP flowmeter and a volume meter in series or in hybrid integrated form. The combination of the readings from the two gives increased metering capabilities.

4 Claims, 4 Drawing Sheets

HYBRID FLOWMETER THAT INCLUDES AN INTEGRAL VORTEX FLOWMETER AND A DIFFERENTIAL FLOW METER

BACKGROUND OF THE INVENTION

1. Field of the Invention

The present invention relates to improvements in or relating to flow metering, in particular to a new flow meter and associated method of flow metering for the determination of density, volume and mass flow rates for a single phase flow.

2. Description of Related Art

The metering of fluid flows is a vital part of many engineering processes' control and is therefore directly related to safety and efficiency. In the case of hydrocarbon production wells the fluid flow meter is recording the rate of production and therefore directly recording the monetary flow from the well in question. Clearly, it is vital for industry to have as accurate and reliable a flow meter as possible for many applications. The reality is of course that no meter is ideal for every application and industry is always searching for meters that are cheaper, more reliable, and accurate.

One important class of flow meters are those that are suitable for obtaining a mass or a volume flow rate as a function of density, an example of which is the differential pressure (DP) flow meter. In the basic sense, a DP flow meter combines Bernoulli's theorem (i.e. the conservation of energy of a fluid flow) and the conservation of mass of a fluid flow between two points in a flow, and the difference in pressure between these two points is measured so that a mass or volume flow rate can be expressed as a function of this differential pressure and the fluid density. A DP meter comprises an obstruction to fluid flow and means for measuring the pressure change caused by the obstruction, giving associated flow rate equations for either volume flow rate or mass flow rate wherein these respective flow rate equations are both functions of density. The obstruction is defined by a "primary element" which can be either a constriction formed in the conduit or a structure inserted into the conduit. The primary element can be for example a Venturi constriction, an orifice plate, a cone shaped element or other form.

Pressure tappings are inserted up stream from the primary element and at or in the vicinity of the primary element and the pressure difference between the two points is monitored. The primary element causes a drop in pressure, and it is customary to measure the pressure at the point of the conduit that corresponds to the lowest pressure. For a Venturi meter, this measurement point will correspond to the "throat" of the primary element, that is, the point of the element that has the minimum cross sectional area. (If the precise position of the lowest pressure is not known for a particular geometry of primary element (as for example in the case of Orifice Plate Meters) it is customary to select a stated position where it is known the pressure will be significantly lower than the pressure tapping up stream of the primary element.)

A further example of a type of meter that is suitable for obtaining a mass or a volume flow rate as a function of density is the so called target meter. In its basic sense, a target meters measures the drag force applied to an object inserted into the fluid on a supporting strut. The drag force is a direct function of the flow's dynamic pressure so when the drag and the mass continuity equations are combined the result is that a mass or volume flow rate can be expressed as a function of the measured drag force and the fluid density.

Another type of flow meter is a velocity flow meter, which in its broadest sense can be taken to be any meter that has means to estimate the volume flow rate of a fluid flowing through a conduit. Velocity flow meters are also sometimes called "linear" or "volume" flow meters, which are hereby taken to be equivalent expressions. These flow meters are not dependent on density—they give no mass flow or density output. These meter designs directly estimate the volume flow rate of the fluid regardless of the fluid density. Examples of volume flow meters include Vortex meters, Positive Displacement (PD) meters, Ultrasonic meters and Turbine meters. With the exception of the PD meter these mentioned volume meters are sometimes described as velocity meters as they give the average velocity of the fluid which in turn can be expressed as a volume flow rate as the cross sectional area of the pipe is known. (The PD meter measures the volume flow rate directly).

Currently, mass flow can only be measured directly by a Coriolis meter. Coriolis meters are, relative to the pipe size for which they are used, large, heavy, and expensive pieces of equipment. The size problem makes them impractical for use at line sizes above 12". Also, for practical applications (oil rig, refinery, pharmaceutical plants etc) there are pumps and valves and other components that cause vibrations in the pipe that can sometimes interfere with the frequency readings read by a Coriolis meter. This noise needs to be filtered out of the Coriolis meter readings, but sometimes (depending on frequency ranges) the noise cannot be filtered out as it's too close to the meter's frequency and the reading is drowned out. Therefore, Coriolis meters are not ideal mass meters but they are all industry has that measures mass flow directly. A Coriolis meter also indicates the density of the flowing fluid and through this, one can estimate the volume flow rate.

When a Coriolis meter is not chosen to measure mass flow and density, the density of the fluid has to be calculated directly. This is done by pressure and temperature measurements and for the properties of the known fluid a "P VT" (i.e. Pressure, Volume and Temperature) calculation is carried out to predict the density. This relies on the knowledge of the fluid composition and fluid properties being accurate. As this can change periodically in flows such as oil and natural gas production this is not ideal as the density measurement is therefore not in real time but based on periodic spot checks on fluid composition. If the fluid composition changes it is not discovered that the fluid density prediction is wrong and hence the meters mass flow rate prediction is wrong until the next sample is taken and analyzed.

As an example (it is to be understood that the scope and application of the following invention is not limited to any particular industry), in natural gas flows, a gas chromatograph takes a sample and analyses the gas components. It then feeds that information to a P VT calculation that predicts the gas density from the measured pressure and temperature from the meter. Carrying out this process with the best known equipment in the shortest possible time is said to take around six minutes to produce a gas density. In many cases it takes longer than six minutes. When that is done it automatically starts again. This is the density the flow computer uses to calculate the mass flow rates from the installed meters until it is updated every gas chromatograph/P VT cycle. If there are fluctuations in the gas composition (and hence density) at a frequency greater than the frequency of the P VT up date this system does not see it very clearly. The calculation is a static reading of that particular grabbed fluid sample and the system is assuming that is representative of the flow over a period of time. This inaccuracy can be significant. A monitor that gives more up to date predictions of density could be very valuable to industry.

When the density is calculated it can then be used in conjunction with a velocity meter to predict the mass flow rate.

Alternatively, the density can be substituted into the DP meter equation for mass and the DP meter equation for volume to give mass and volume flow rates. However, industry does not have a way of checking the density prediction of the PVT calculation and also has no way of measuring mass flow without using a PVT calculation or a Coriolis meter.

SUMMARY OF THE INVENTION

As described above, it is traditional to choose one particular type of flow meter based on the particular application, and so industry usually chooses either a velocity flow meter (of which there are many different types) or a differential pressure (DP) flow meter (of which there are many different types).

However, the present invention provides a new flow meter apparatus that comprises a combination of a velocity flow meter with a DP flow meter, in order to obtain a metering system that is capable of predicting the mass flow rate, volume flow rate and the density of the flowing fluid.

In a first embodiment, a velocity flow meter and a DP flow meter are connected in series (the velocity flow meter can be either of upstream or downstream of the DP meter), while in a second embodiment, the velocity flow meter is formed as a component part of a DP flow meter.

According to a first aspect of the present invention, there is provided a flow meter apparatus for measuring single phase flow through a fluid conduit, comprising a velocity flow metering means and a second flow metering means suitable for obtaining a mass or a volume flow rate as a function of density, arranged such that the flow meter apparatus functions as a combined density, volume and mass flow meter. The second flow metering means can comprise a differential pressure (DP) flow metering means or a target meter. The velocity flow metering means can be provided either up stream or downstream of the second flow metering means.

The velocity flow metering means can comprise for example of an ultrasonic flow meter (of transducers either integral to the meter body or of clamp on design) or a vortex flow meter, while the DP flow metering means can for example be of the cone type or venturi type. Any combination of velocity flow metering means and second flow metering means is possible, but two preferred combinations are that of a vortex flow meter with a cone type DP flow meter, and of an ultrasonic flow meter with a venturi type DP flow meter.

The DP flow metering means can also take the form of a straight length of pipe of known inside bore and roughness.

The second flow metering means is advantageously calibrated to take into account the effect on the fluid flow of the velocity flow metering means, preferably by an adjustment of the discharge coefficient used in the calculation of the flow parameters.

According to a second aspect of the invention, there is provided a hybrid flow meter apparatus for measuring single phase flow through a fluid conduit, comprising a velocity flow metering means integrated with a second flow metering means suitable for obtaining a mass or a volume flow rate as a function of density. The second flow metering means can comprise a differential pressure (DP) flow metering means or a target meter.

In one embodiment, a sup port member for a primary element of the second flow metering means is formed as a vortex shedding bluff body. Alternatively, a thermocouple probe of the second flow metering means is formed as a vortex shedding bluff body, or a DP flow metering means can comprise a venturi type meter and the velocity flow metering means can comprise an ultrasound meter provided at a throat portion of the DP flow metering means.

According to a third aspect of the invention, there is provided a method of metering single phase fluid flow through a conduit, comprising the steps of: using a velocity flow metering means to obtain the fluid's volume flow rate independent of the fluid's density; using a second flow metering means to obtain the fluid's volume flow rate as a function of the fluid density; and combining the readings obtained from the second flow metering means and the velocity flow metering means to obtain the density of the fluid.

The second flow metering means can comprise a differential pressure (DP) flow metering means or a target meter.

The method preferably further comprises the step of using the obtained density to calculate the fluid's mass flow rate.

If required, the second flow metering means is advantageously calibrated to take into account the effect on the fluid flow of the velocity flow metering means, preferably by an adjustment of the discharge coefficient used in the calculation of the flow parameters.

According to a third aspect of the invention, there is provided a comuputer program product, encoded with instructions that, when run on a computer enable it to combine the readings obtained from a velocity flow metering means and a second flow metering means suitable for obtaining a mass or a volume flow rate as a function of density to obtain the density and mass flow rate of a single phase fluid flow through a conduit.

DETAILED DESCRIPTION OF THE INVENTION

Figure 1:
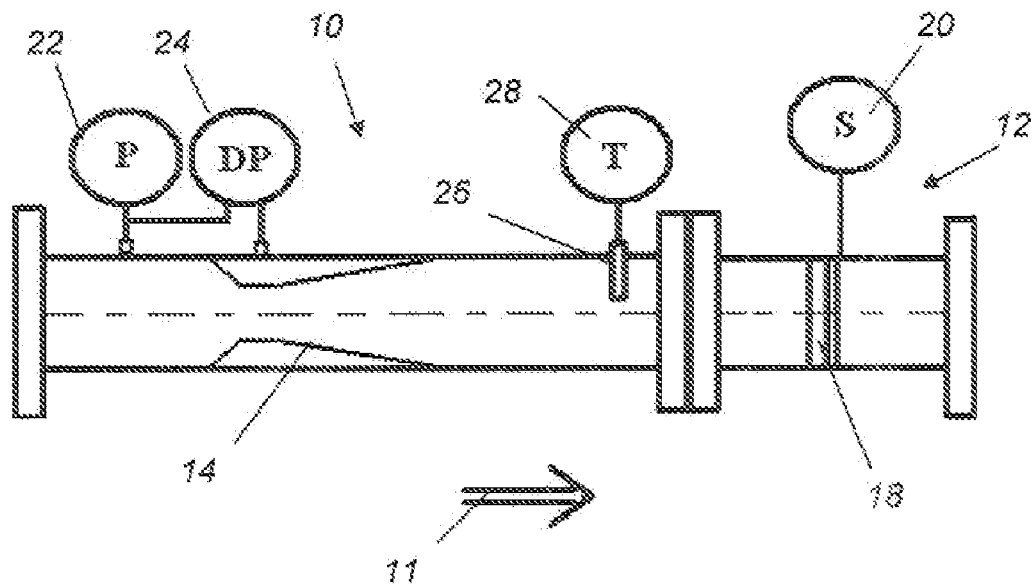
FIG. 1 illustrates a first, specific embodiment of the invention, wherein a venturi type differential pressure (DP) flow meter is provided up stream of a vortex type velocity meter.

The present invention will now be described, by way of example only, with reference to the above drawings.

The principles and operation of DP flow meters are well known per se, and are described in the International Standard Organisation ISO/FDIS 5167, 2003 Edition, "Measurement of fluid flow by means of pressure differential devices inserted in circular cross-section conduits running full"; and discussed in more detail in the PhD thesis, "Wet Gas Metering" by Richard Steven, University of Strathclyde, Glasgow, United Kingdom, April 2001, which is incorporated herein by reference.

The generic equation for the volume flow rate given by a DP flow meter is:

$$\dot{Q} = EA_t \varepsilon C_d \sqrt{\frac{2\Delta P_t}{\rho}} \qquad (1)$$

Where:
Q is the volume flow rate;
$A_t$ is the cross-sectional area of the fluid conduit at a chosen point of the conduit at which this cross sectional area is less than the meter inlet area and therefore the fluid has a lower pressure than at the inlet. For a Venturi meter, this point will correspond to the "throat" of the primary element, that is, the point of the element that has the minimum cross sectional area;
E is a dimensionless number called the velocity of approach. It is related to the well known "beta ratio" which is itself related to the ratio of the cross-sectional area of the conduit at the chosen point of lower pressure to the cross-sectional area of the conduit at an inlet portion to the DP flow meter;
$\varepsilon$ is the expansion, or expansibility, factor, which is found experimentally. It is commonly denoted as "$\varepsilon$" in Europe, and "Y" in the US.
$C_d$ is the discharge coefficient, representing energy losses caused by the flow meter;
$\Delta P_t$ is the pressure difference between the meter's inlet and a point of lower pressure (usually (but not always) the throat); and $\rho$ is the fluid density.

Differential Pressure (DP) Meters are not mass or volume flow meters if the density is not known. These meters do not predict either of these parameters unless the density is known from an external source, for example by a prior art P VT calculation. That is, the mass or volume flow rate can be calculated by a DP meter only if the density is already known. Another way of expressing this statement is a DP meter gives the volume flow rate as a function of the fluid density.

For a velocity flow meter, the mass flow rate is equal to the product of the fluid density and volume flow rate, that is $$\dot{m} = \rho \dot{Q}_{Vol\,Meter} \qquad (2)$$

The inventor has realized that if any velocity flow meter is in series with any generic DP meter then the DP meter equation (equation 1) still gives the volume flow rate as a function of the fluid density and, as the velocity flow meter is stating the volume flow rate (independently of the fluid density) the only unknown in the DP meter volume flow rate equation if the velocity flow meter volume flow rate prediction is substituted in is the density which can therefore be solved. It will be appreciated that this principle holds valid for any DP meter equation, not just for the classical generic equation given at equation (1) above. Non-classical DP meter equations can for example be derived for a straight pipe DP (friction DP); the recovery pressure behind the meter; or the total friction/pressure loss across a meter. Any one of these or other DP meter equations can be used in combination with the velocity meter to calculate the density. Mathematically, the principle for the specific example of the generic DP meter equation can be expressed as follows:

Firstly, we will assume that we have the velocity flow rate meter output, $Q_{Vol\,Meter}$. The DP Meter volume flow rate equation is as shown in equation (1) above. As the velocity flow meter is stating the volume flow rate $Q_{Vol\,Meter}$ we can substitute this into equation 1 and get:

$$\dot{Q}_{VolMeter} = EA_t \varepsilon C_d \sqrt{\frac{2\Delta P_t}{\rho}} \qquad (3)$$

Equation 3 can be re-arranged to give an expression for the density:

$$\rho = (EA_t \varepsilon C_d)^2 \left(\frac{1}{\dot{Q}_{VolMeter}}\right)^2 (2\Delta P_t) \qquad (4)$$

And therefore:

$$\dot{m} = \rho \dot{Q}_{Vol\,Meter} = EA_t \varepsilon C_d \sqrt{2\rho \Delta P_t} \qquad (5)$$

Note that without density the volume flow rate can not be derived from the DP meter equation 1.

A worked example will therefore now be discussed, wherein the type of velocity flow meter used is a vortex meter.

When exposed to a free stream a suitable bluff body will shed vortices in a cyclic fashion that form a von Karman vortex street downstream of the bluff body. Experiments have shown (although theory is lacking) that the frequently of shedding is directly proportional to the average velocity. The Strouhal number (St) is defined as:

$$St = \frac{fd}{V} \qquad (6)$$

where: St is the Strouhal number, f is the shedding frequency, d is a dimension of the bluff body, typically its width, and $\overline{V}$ is the average fluid velocity.

It is a constant over a large turn down (for non-insertion vortex meters at least). For larger turn downs the Strouhal number may be a function of the Reynolds number. If the Strouhal number (St) is found by calibration then by reading the frequency of vortex shedding (f) and knowing the bluff body width (d) the average velocity (V) can be found. Let:

$$\overline{V} = \frac{fd}{St} = \frac{f}{C}$$

where C is a constant if St is a constant.
Volume flow rate Q is calculated by:

$$Q = A\overline{V} = A\frac{f}{C} = \frac{f}{K}. \qquad (7)$$

Where A is the cross sectional area of the meter inlet and K is the meter factor and is found by calibration.
Note:

$$K = \frac{St}{Ad} \qquad (8)$$

So the Vortex Meter Equation for the volume flow rate is:

$$Q = \frac{f}{K} \quad (9)$$

Now substituting in the Vortex meter volume flow rate (equation 9) into equation 3 we get:

$$\frac{f}{K} = EA_t \varepsilon C_d \sqrt{\frac{2\Delta P}{\rho}} \quad (10)$$

Note that if $C_d$ is a constant (a reasonable approximation) then this equation has one unknown, i.e. density. This can be separated out:

$$\rho = (EA_t \varepsilon C_d)^2 \left(\frac{K}{f}\right)^2 (2\Delta P) \quad (11)$$

If $C_d$ is found by experiment not to be constant but variable with the Reynolds number of the flow then Cd can be defined as an arbitrary function found by calibration, which we call g(Re). Then as:

$$Re = \frac{4\dot{m}}{\pi \mu D} = \frac{4\rho \dot{Q}}{\pi \mu D} = \frac{4\rho f}{\pi \mu D K}, \quad (12)$$

where $\mu$ is the fluid viscosity and D is a defined length (usually the inside bore of the meter inlet) we have to iterate on density for the following equation:

$$\rho - \left\{ \left( EA_t \varepsilon \left\{ g\left\{ \frac{4\rho f}{\pi \mu D K} \right\} \right\} \right)^2 \left(\frac{K}{f}\right)^2 (2\Delta P) \right\} = 0 \quad (13)$$

Once the density is found we can get the mass flow by applying equation 5 we get equation 14:

$$\dot{m} = EA_t \varepsilon C_d \sqrt{2\rho \Delta P} = \rho \frac{f}{K} \quad (14)$$

The example above is given for vortex meters but there is no reason why the same procedure can not be repeated for any velocity flow meter in series with any DP meter. That is in general terms:

Any velocity flow meter reading can be substituted into any DP meter volume meter:

$$\dot{Q}_{Volume\ Meter} = EA_t \varepsilon C_d \sqrt{\frac{2\Delta P}{\rho}} \quad (15)$$

Therefore:

$$\rho = (EA_t \varepsilon C_d)^2 \left(\frac{1}{\dot{Q}_{Volume\ Meter}}\right)^2 (2\Delta P) \quad (16)$$

$$\dot{m} = Ea_t \varepsilon \dot{C}_d \sqrt{2\rho \Delta P} = \rho \dot{Q}_{Volume\ Meter} \quad (17)$$

It is to be understood that the scope of the invention is not limited to the use of any particular DP flow meter, any particular velocity flow meter, or to any particular combination of DP flow meter and velocity flow meter. For example, the DP flow meter could be comprised simply of straight length of pipe of known inside bore and roughness that can then be used as a differential pressure (DP) meter if the permanent pressure loss is measured for a stated length of pipe; or the DP flow meter could be any of a cone meter, Venturi meter, Orifice Plate Meter, Eccentric Orifice Plate Meter, Segmental Orifice Plate Meter, Nozzle Meter, Venturi Nozzle Meter, Wedge Meter, Conditioning Plate Orifice Meter, to name but a few. It is to be appreciated that the scope of the invention is in no way limited to any particular type of DP meter, whether or not it is listed above, and it applies also to any type of non-standard DP meter, or to functionally equivalent meters that provide a flow rate equation where flow rate is a function of density, such as an averaging pitot tube or a target meter.

Given the wide variety of environments and applications for which this invention could have utility, it is to be understood that the best mode for carrying out the invention will depend to a large extent on the particular circumstances of the case where it is to be applied. However, a discussion of the parameters that may guide the choice of meter together with some examples of preferred embodiments will now be given.

Traditionally, it is not seen as good practice to have any pipe disturbance close to a standard DP meter as this could adversely affect the DP meters performance. Use of an Ultrasonic meter would not disturb the velocity profile of fluid flowing into the DP meter and would therefore be a reasonable choice of velocity flow rate meter for the present invention.

However, Ultrasonic meters can be relatively expensive and are therefore not always suitable. A generic DP meter could be calibrated for the disturbance caused by an intrusive velocity meter, for example by making an appropriate adjustment to the discharge coefficient. Therefore, any generic velocity flow meter can be used unless the resulting DP meter discharge coefficient was found to be highly non-linear with Reynolds number.

Examples of DP meters and Velocity meters in series are a vortex meter up stream or down stream of a cone type DP meter or an Ultrasonic meter (even a clamp on type) up stream or down stream of a Venturi DP meter. Any DP meter and Velocity meter combination will potentially work although obviously particular pairs offer more advantages than others in terms of cost verses performance. For example: From reported performances the cone type DP meter appears to be a suitable DP meter as it is reported to have been found to be virtually immune to up stream disturbances by tests following the American Petroleum Institutes (AP I) Chapter 22.2 test protocol for non standard DP meters. In this case any intrusive velocity meter (e.g. a vortex meter, P D meter, turbine meter etc.) would be the disturbance. Also, the ultrasonic meter is a very accurate velocity meter and is non intrusive, so an ultrasonic meter Venturi meter could also be a good combination.

For the case of using a stand alone DP meter and a stand alone velocity flow rate meter a source of error is the distance between the meters. The further apart they are the more permanent pressure loss (sometimes called "head loss") there is between them and the more resulting density drop in the case of a gas flow where density reduces directly proportional to pressure. One possible way around this is to bolt the two stand alone velocity flow and DP meters directly to each other and calibrate them accordingly.

Selected examples of such arrangements are illustrated in FIGS. 1-4. FIG. 1 shows a first embodiment, wherein a venturi type flow meter 10 is provided up stream of a vortex type velocity meter 12. The direction of the fluid flow through the conduit is shown by arrow 11. The venturi meter 10 comprises a venturi primary element 14, while the vortex meter 12 comprises a vortex bluff body 18 and a vortex shredding frequency sensor 20. The apparatus is optionally provided with pressure sensors 22, 24, and a thermocouple 26 with associated temperature sensor 28.

Figure 2:
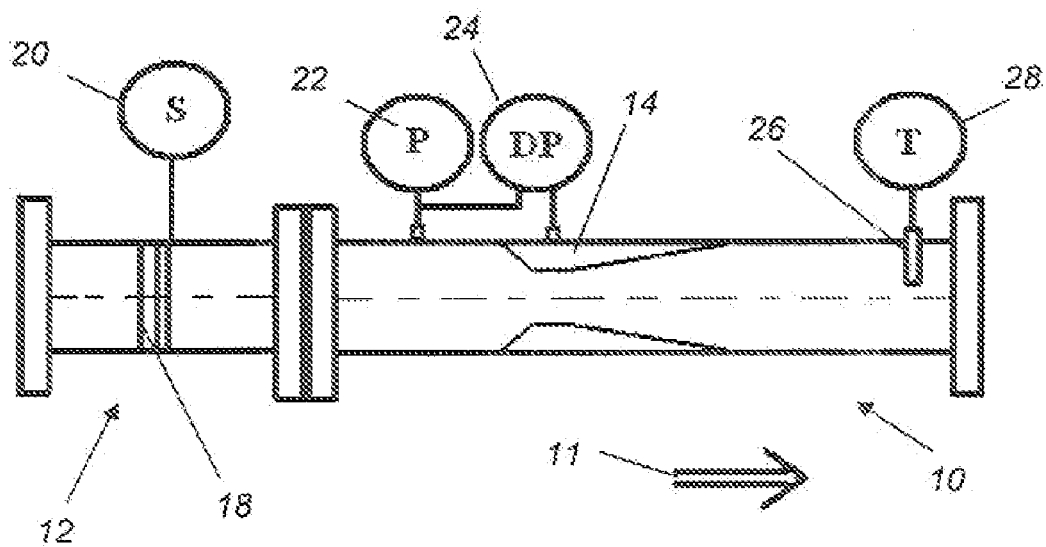
FIG. 2 illustrates a second specific embodiment of the invention, wherein a venturi type differential pressure (DP) flow meter is provided downstream of a vortex type velocity meter.

FIG. 2 shows a second embodiment which is similar to the first embodiment except that the venturi type DP flow meter and the vortex type velocity meter are swapped around with respect to the direction of flow. Like components are illustrated with like reference numerals.

Figure 3:
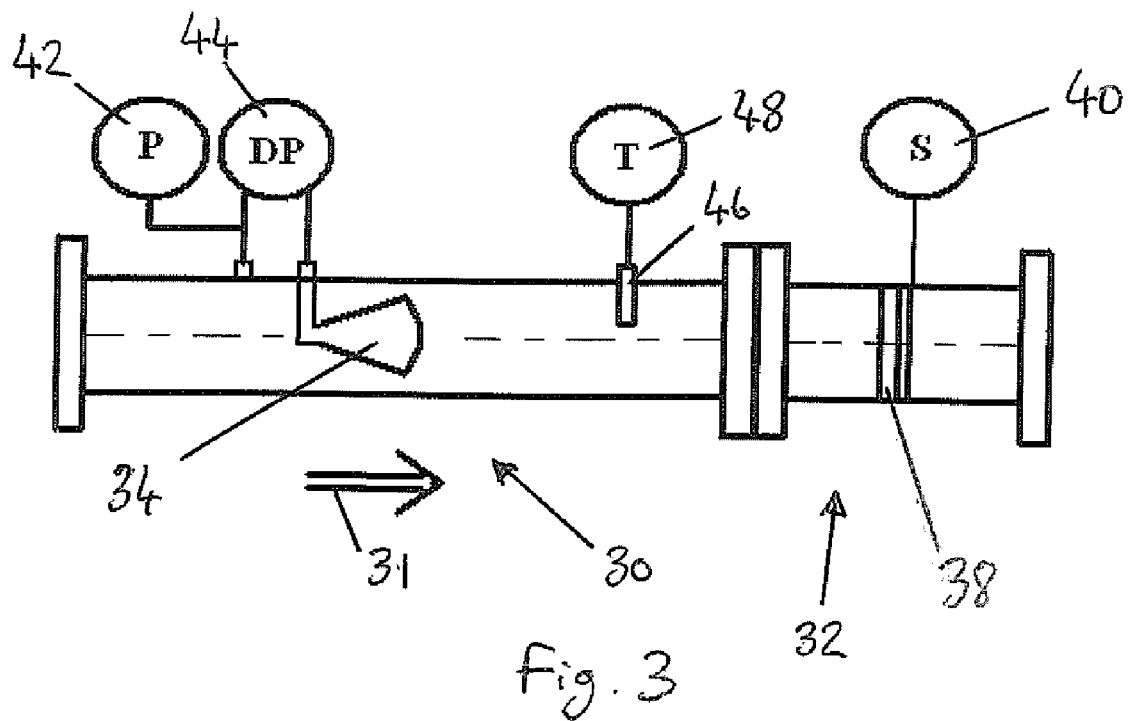
FIG. 3 illustrates a third specific embodiment of the invention, wherein a cone type differential pressure (DP) flow meter is provided up stream of a vortex type velocity meter.

FIG. 3 FIG. 1 shows a third embodiment, wherein a cone type flow meter 30 is provided up stream of a vortex type velocity meter 32. The direction of the fluid flow through the conduit is shown by arrow 31. The cone meter 30 comprises a cone primary element 34, while the vortex meter 32 comprises a vortex bluff body 38 and a vortex shredding frequency sensor 40. The apparatus is optionally provided with pressure sensors 42, 44, and a thermocouple 46 with associated temperature sensor 48.

Figure 4:
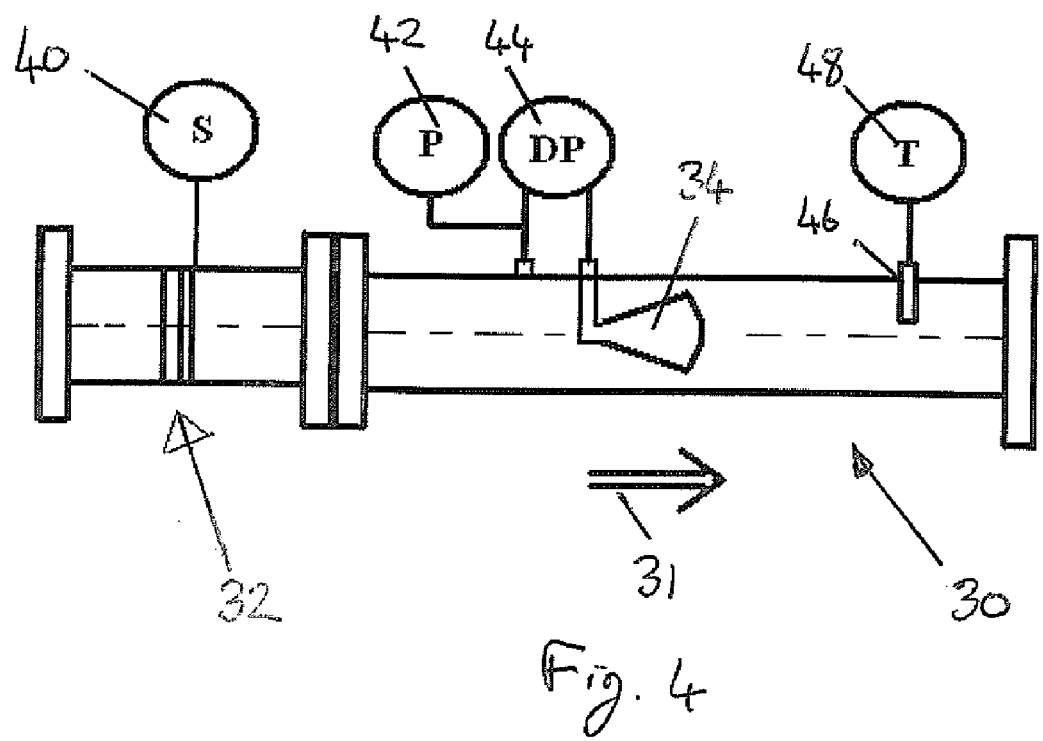
FIG. 4 illustrates a fourth specific embodiment of the invention, wherein a cone type differential pressure (DP) flow meter is provided downstream of a vortex type velocity meter.

FIG. 4 shows a fourth embodiment which is similar to the third embodiment except that the cone type DP flow meter and the vortex type velocity meter are swapped around with respect to the direction of flow. Like components are illustrated with like reference numerals.

It will be appreciated that the measurement of P and T shown in FIGS. 1-4 is optional according to the present invention. It is only necessary to read both if a P VT calculation is to be performed. In this case, the new structure and method of the invention gives a density reading that can be used as a diagnostic to check the accuracy of the P VT measurement.

Alternatively, a hybrid meter can be built wherein a velocity flow meter design is incorporated into a DP meter. Examples are the support strut for a cone type DP meter could be made into a bluff body so that it is a vortex meter within a DP meter. On the same theme the thermocouple probe downstream of any DP meter could be made into a thermocouple/insertion vortex meter. A different approach to the same idea would be to place an ultrasonic meter in the throat of a Venturi meter. This could be a full ultrasonic design (i.e. with inset ultrasonic ports integral to the meter body) or a clamp on ultrasonic meter. (For some ultrasonic designs it may be necessary to extend the Venturi throat length to incorporate the ultrasonic meter.) It will be appreciated that numerous other combinations all based on this concept could be used.

Figure 5:
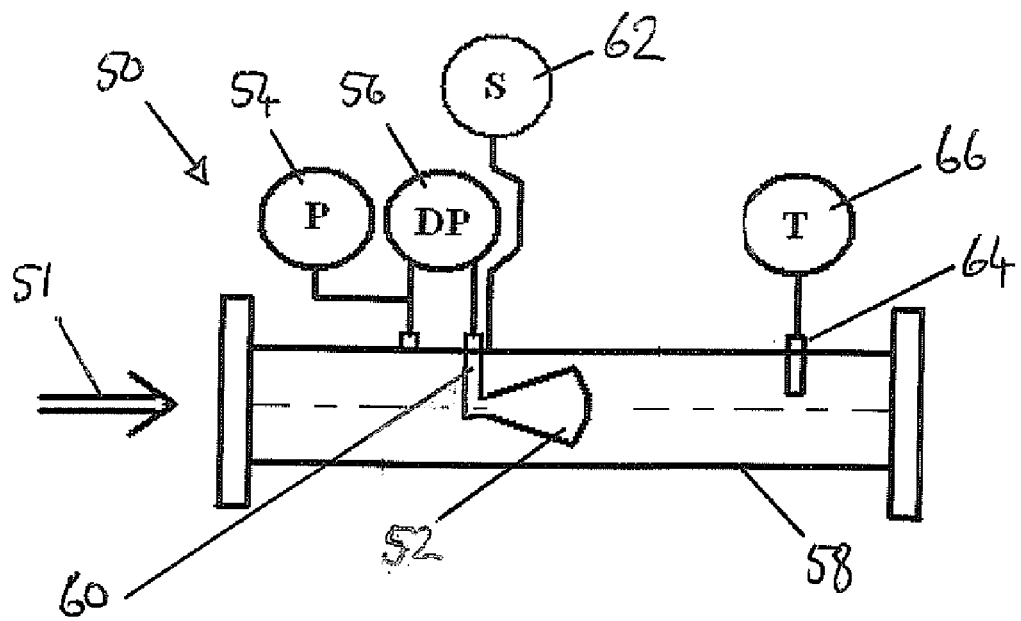
FIG. 5 illustrates a hybrid flow meter apparatus according to a fifth specific embodiment.
Figure 6:
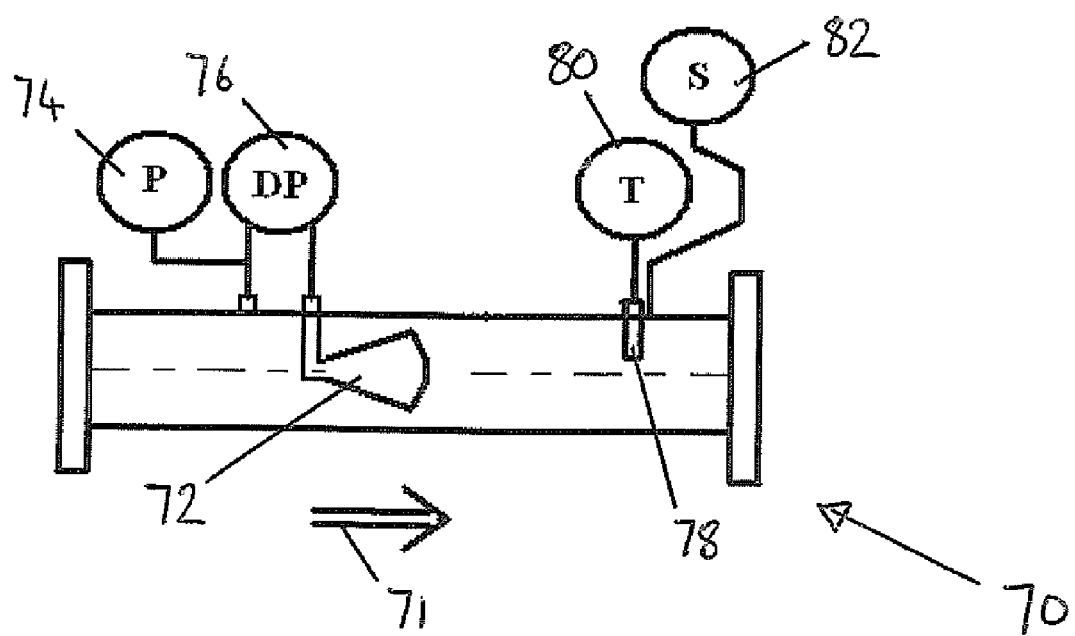
FIG. 6 illustrates a hybrid flow meter apparatus according to a sixth specific embodiment.
Figure 7:
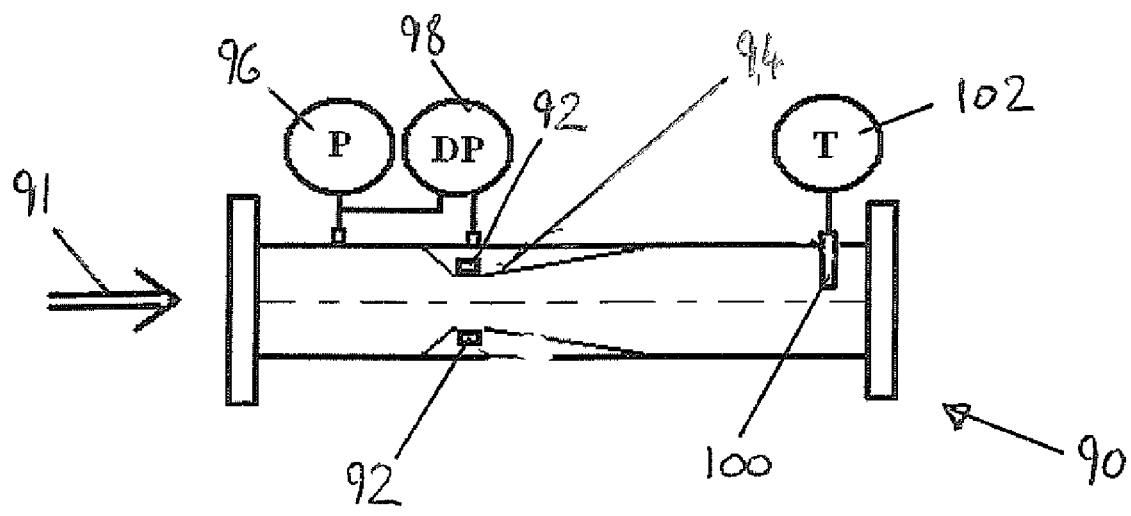
FIG. 7 illustrates a hybrid flow meter apparatus according to a seventh specific embodiment.

Selected examples of such arrangements are illustrated in FIGS. 5-7. In the example of FIG. 5, a hybrid flow meter apparatus 50 comprises a differential pressure (DP) type flow meter comprising a cone type primary element 52 and pressure sensors 54, 56. The direction of fluid flow is illustrated by arrow 51. The cone type primary element 52 is supported in the fluid conduit 58 by a support strut 60, which also functions as the bluff body for a vortex type velocity meter, with vortex shedding frequency sensor 62. An optional thermocouple 64 with associated temperature sensor 66 can also be provided.

A further example embodiment is shown in FIG. 6. A hybrid flow meter apparatus 70 comprises a differential pressure (DP) type flow meter comprising a cone type primary element 72 and pressure sensors 74, 76. The direction of fluid flow is illustrated by arrow 71. A thermocouple 78 with associated temperature sensor 80 is also provided. In this example, the container that is, the body, of the thermocouple 78 functions as the bluff body for a vortex type velocity meter, implemented via vortex shedding frequency sensor 82.

FIG. 7 illustrates a further embodiment of a hybrid flow meter 90 which comprises a venturi type DP flow meter in combination with an ultrasonic velocity flow meter. The direction of fluid flow is shown by the arrow 91. Ultrasonic transducers 92 are provided at or in the vicinity of the throat region of the venturi primary element 94 of the DP flow meter. The transducers 92 can be embedded in the throat region, which may be extended as necessary in order to fit the transducers, The DP flow meter is provided with pressure sensors 96, 98, while an optional thermocouple 100 with associated temperature sensor 102 can also be provided.

The system and method of the invention can either replace the separate P VT calculation for cases where precise calculations are not essential, be used as a secondary check to the P VT calculation (as currently P VT calculations tends to be blindly believed) or be used to monitor real time fluctuations of the density to see if the assumption of the density being relatively constant between the up date times is valid. Whereas it takes existing P VT calculation equipment six minutes or more to analyze the sample composition and feed the info to the P VT calculation, the DP meter/velocity meter combination reads the actual density regardless of the gas composition up to several times a second, an order of magnitude improvement with respect to the use of normal separate P VT calculations.

The invention claimed is:

1. A hybrid flow meter apparatus for measuring single phase flow through a fluid conduit, comprising a velocity flow meter integrated with a differential pressure (DP) flow meter;
    said velocity flow meter comprising a vortex shedding bluff body and a vortex shedding frequency sensor in close proximity to the vortex shedding bluff body on the downstream side;
    said DP flow meter comprising a primary element forming a fluid obstruction, said primary element being supported by a support member; characterised in that:
    the support member for the primary element of the DP flow meter is formed as the vortex shedding bluff body of the velocity flow meter.

2. The apparatus of claim 1, wherein the DP flow meter comprises a cone type DP flow meter.

3. The apparatus of claim 2, further comprising a computer running a computer program product encoded with instructions for calibrating the DP flow meter to take into account the effect on the fluid flow of the velocity flow meter.

4. The apparatus of claim 1, further comprising a computer running a computer program product encoded with instructions for calibrating the DP flow meter to take into account the effect on the fluid flow of the velocity flow meter.

* * * * *